Patented Nov. 22, 1938

2,137,465

UNITED STATES PATENT OFFICE 2,137,465

PROCESS OF FINISHING TEXTILES

William J. Thackston, Haddon Heights, N. J., assignor to Röhm & Haas Company, Philadelphia, Pa.

No Drawing. Application May 11, 1937,
Serial No. 141,931

7 Claims. (Cl. 91—68)

This invention is for an improvement in processes of treating textile fibers and fabrics with resins and resin forming compositions, particularly of the urea formaldehyde type. It resides in adding to the resin or resin forming composition certain amine and quaternary ammonium salts, which have been found to substantially soften and increase the flexibility of the treated material.

Textile fabrics and fibers are treated with resins and resin forming compositions for a variety of purposes. In the so-called "creaseproofing" process the fibers, either in the form of threads or woven fabrics and usually cellulosic, are impregnated with dimethylol urea or an incompletely condensed urea-formaldehyde reaction product and the resin formed within the fibers by completing the condensation. By this treatment fabrics less susceptible to wrinkling are obtained. In other processes a thin coating of a reactive resin is applied to the individual threads of a fabric and the condensation completed whereby a resin bond is produced where each thread crosses another thread giving a fabric the threads of which will not slip or fray. This type of finish is commonly called a "non-slip" finish. In still other processes resin compositions are applied as a coating to the back of a fabric to produce a filling effect i. e. "back-filling" or to the front to produce a glazed surface, as in glazed chintz. Also, in the production of artificial leather by laminating fabrics resins are used to impregnate the fabrics and to cause adherence between the laminae.

In all these processes the synthetic resins most widely used are those of the urea-formaldehyde type. Polymers of acrylic and methacrylic esters such as the methyl and ethyl esters are used to a lesser extent and in back filling where transparency and color stability are minor considerations alkyd resins and occasionally phenol formaldehyde resins are also used.

The limiting factor in all resin treatment of fabrics is the tremendous increase in stiffness which accompanies resin application. For this reason the "creaseproofing" process cannot be applied to many linen fabrics or to light fabrics with fine fibers. Attempts to do so give such brittle fibers that they are easily broken and possess poor wearing qualities. With pile fabrics such as velvets, a crush-resistance can be obtained but only by sacrificing the soft, silky quality of the cloth. Similarly, in glazing, back-filling and "non-slip" finishing, the resins give a stiffness and harshness to the cloth that detracts from their value.

The object of this invention is to provide a way to obtain softer and more flexible resin treated fabrics and threads, particularly fabrics that have been treated with resin to increase their crush-resistance, or to produce "non-slip" finish.

It has been found that softer and more flexible fabrics can be obtained by adding to the resin or resin forming composition an amine or quaternary ammonium salt that has as one of its nitrogen substituents an aliphatic group preferably a hydrocarbon group containing twelve or more carbon atoms. Salts of this type in which all the substituent groups contain less than twelve carbon atoms show little or no plasticizing action. As the size of the substituent group is increased the effectiveness becomes greater, the useful range beginning at about twelve carbon atoms. Compounds in which there is a substituent group of sixteen or more atoms are very effective. The anion of the salt may be either organic or inorganic, monovalent or polyvalent but for economical reasons the chlorides, sulfates, and acetates are preferred. Among the various salts that have been found useful may be mentioned—

Dimethyl phenyl cetyl ammonium chloride.
Dimethyl benzyl cetyl ammonium sulfate.
Dimethyl benzyl oleyl ammonium chloride.
Dimethyl benzyl lauryl ammonium chloride.
Diethyl methallyl cetyl ammonium chloride.
Diethyl benzyl lauryl ammonium phosphate.
Dimethyl cetyl amine hydrochloride.
Dimethyl benzyl cetyl ammonium acetate.
Dimethyl benzyl cetyl ammonium oleate.
Dimethyl benzyl cetyl ammonium stearate.

While these materials have value when used with any of the resinous materials commonly employed in treating fabrics they have particular merit when used in conjunction with urea-formaldehyde condensation products. The following detailed description will therefore be confined to this type of resin.

In applying the invention no changes are necessary in the standard technical procedure for producing any of the aforementioned special effects as now employed by textile finishing plants. There is only involved the additional step of incorporating the proper amount of amine or quaternary ammonium salt in the resin solution or dispersion that is used. Preferably the salt is added in solution to a solution or dispersion of the resin or resin forming composition just prior to its application to the fabrics. For this purpose as standard solution composed of 25% ammonium salt, 25% ethyl alcohol, and 50% water has been found convenient. The function of the ethyl alcohol in this solution is to increase the solvent power of the liquid mixture for the ammonium salt and can be replaced by any other water miscible strong solvent for the salt. Alternatively, the ammonium salt crystals may be dissolved in the solution of the resin, or mixed with dimethylol urea, for instance, and both added to water at the same time.

The quantity of ammonium salt best suited for a particular purpose will vary with the different salts and will depend upon the degree of softening desired. Quantities as low as 2% based upon the dry weight of the resin have been found effective and seldom if ever will quantities in excess of 20% be needed. For most purposes and with the more effective of the ammonium salts about 4–8% gives the best results.

The following examples are given to illustrate how the invention is applied to the treatment of various fabrics. It should be understood, however, that it is also applicable to other fabrics and to the treatment of threads prior to their being woven.

*Example 1.*—An impregnating solution consisting of

| | Parts |
|---|---|
| Dimethylol urea | 25 |
| Diammonium phosphate | 1 |
| Dimethyl benzyl cetyl ammonium chloride | 2 |
| Water | 72 | was prepared by dissolving the dimethylol urea, diammonium phosphate, and dimethyl benzyl cetyl ammonium chloride in separate portions of hot water, cooling each solution and mixing.

A 36" fabric of Irish linen, suitable for a suiting material, which had previously been scoured, mercerized and dyed in a manner well known to the trade was padded through the above solution, dried and cured at 270° F. for 10 minutes. It was then lightly soaped, dried and calendered.

A second sample of the same material was treated in an identical manner except that the dimethyl benzyl cetyl ammonium chloride was omitted from the impregnating solution.

The fabric impregenated with the solution containing the quaternary ammonium salt was highly resistant to crushing yet possessed a soft, resilient feel, whereas the sample impregnated with the solution of dimethylol urea and catalyst only was brittle and boardy.

*Example 2.*—A solution was prepared by mixing one part by weight of urea with two parts of 40% aqueous formaldehyde, refluxing for from three to five minutes, quickly cooling, and diluting with two parts of water. To 98.5 parts of this solution one part of 56% acetic acid and 0.5 part of dimethyl benzyl cetyl ammonium acetate was added.

A silk back, rayon pile, transparent velvet, after dyeing and drying, was thoroughly wet out in this solution, vacuum extracted to remove excess solution, the pile brushed in the usual fashion during drying, and cured for 5 minutes at 300° F. This treatment gave a resilient crush-resistant velvet having a soft and silky hand.

*Example 3.*—A 36" cotton suiting of approximately 2½ yards per pound woven from dyed yarns was impregnated without desizing with a solution containing—

| | Parts |
|---|---|
| Dimethylol urea | 15 |
| Sodium sulfate | 5 |
| Ammonium acetate | 0.5 |
| Solution containing 25% dimethyl lauryl benzyl ammonium sulfate, 25% ethyl alcohol and 50% water | 3.5 |
| Water | 76 |

The goods were wet out as before, tightly squeezed in a three roll mangle and dried on a frame. After drying the fabric was run through a hot air drier for six minutes at 280° to 290° F. On mechanically finishing the resulting cloth is very resilient, yet full and soft to touch making it particularly adapted for the production of a suiting which will hold its crease.

*Example 4.*—A 38" woven fabric of spun rayon weighing 29 pounds to the 70 yard piece was wet out in a solution containing 5 parts of an approximately 40% solution of a resinous urea-formaldehyde reaction product made by condensing one mol of urea with approximately 2.25 mols of aqueous formaldehyde in neutral solution until the viscosity reaches approximately 20–30 centipoises at 25° C. 0.2 part of ammonium dihydrogen phosphate, and 0.2 part of diethyl methallyl cetyl ammonium chloride. The resin solution was thoroughly squeezed into the fabric on a three roll quetch, the fabric then dried in a loop drier and cured for 5 minutes at 310° F. The resulting fabric after framing had a full, yet soft and smooth hand, free from any of the usual stiffening and embrittlement.

*Example 5.*—An all wool tropical worsted suiting material was thoroughly wet out in a solution containing—

| | Parts |
|---|---|
| Dimethylol urea | 12 |
| Corn sugar (Cerelose) | 4 |
| Diammonium phosphate | 0.5 |
| Diethyl lauryl benzyl ammonium phosphate | 1 |
| Water | 82.5 |

After squeezing, the goods were dried and then cured at 240°–250° F. for 30 minutes. Without further treatment the goods were fuller, softer, and heavier to the touch, were permanently increased in weight 15%, were more resilient, and showed a reduced tendency towards shrinkage in use as a garment.

*Example 6.*—A 37" dyed crepe dress fabric weighing approximately 18 pounds to a 70 yard piece and consisting of cellulose acetate warp yarns and spun rayon filling yarns was impregnated with the same solution as given in Example 1 with the exception that an equal amount of dimethyl cetyl amine hydrochloride was substituted for the quaternary ammonium salt. After squeezing on a 2 roll reverse quetch, the fabric was dried, and cured in a hot air drier in the presence of superheated steam for 12 minutes at 260° F. The fabric was then rinsed in water at 140°–160° F. and dried to produce a material highly resistant to crushing, yet as soft and silky as is required by the trade of such a fabric.

From the foregoing it is apparent that the softening action spoken of is imparted to the fabrics by long alkyl chain amine and quaternary ammonium salts. Since the only essential difference between amine salts and quaternary ammonium salts is the number of hydrogen atoms of the $NH_4$— radical that have been replaced by organic groups, the term "ammonium salt" as used herein is intended to include both.

I claim:

1. In the process of rendering rayon pile fabrics more resistant to crushing by means of a urea-formaldehyde resin, the improvement which comprises incorporating dimethyl benzyl cetyl ammonium chloride in the urea-formaldehyde impregnating bath.

2. In the process of rendering cellulosic fabrics more resistant to crushing by means of a urea-formaldehyde resin, the improvement which comprises incorporating in the urea-formaldehyde impregnating bath a quaternary ammonium salt containing an alkyl substituent of at least 12 carbon atoms.

3. In a process of finishing cellulosic textiles by the application of a urea-formaldehyde resin the improvement which comprises incorporating in the urea-formaldehyde finishing bath an ammonium salt containing as an N substituent an aliphatic hydrocarbon group of at least 12 carbon atoms.

4. In a process of finishing a cellulosic textile by the application of a resin, the improvement which comprises incorporating in the finishing bath containing the resin an ammonium salt containing as an N substituent an aliphatic substituent of at least 12 carbon atoms.

5. In a process of finishing textiles by the application of a urea-formaldehyde resin the improvement which comprises incorporating in the urea-formaldehyde finishing bath an ammonium salt containing as an N substituent an aliphatic hydrocarbon group of at least 12 carbon atoms.

6. A cellulosic fabric treated with a urea formaldehyde resin containing an ammonium salt that has an aliphatic hydrocarbon substituent of at least 12 carbon atoms attached to the nitrogen atom.

7. A cellulosic fabric impregnated with a urea formaldehyde resin containing a quaternary ammonium salt that has an alkyl substituent of at least 12 carbon atoms.

WILLIAM J. THACKSTON.